(12) United States Patent
Rönneke

(10) Patent No.: US 8,141,293 B2
(45) Date of Patent: Mar. 27, 2012

(54) TUBE FOR PLANT CULTIVATION PREVENTING ROOT TWIST

(76) Inventor: Peter Rönneke, Göteborg (SE)

( * ) Notice: Subject to any disclaimer, the term of this patent is extended or adjusted under 35 U.S.C. 154(b) by 574 days.

(21) Appl. No.: 12/291,585

(22) Filed: Nov. 12, 2008

(65) Prior Publication Data

US 2010/0115835 A1 May 13, 2010

(51) Int. Cl.
*A01G 9/02* (2006.01)
*A01G 23/04* (2006.01)

(52) U.S. Cl. .................. 47/65.7; 47/66.6; 47/74; 47/77

(58) Field of Classification Search .............. 47/65.5, 47/65.7, 66.6, 66.7, 73, 74, 77, 86; 111/114, 111/900
See application file for complete search history.

(56) References Cited

U.S. PATENT DOCUMENTS

| | | | |
|---|---|---|---|
| 3,736,889 A * | 6/1973 | Reid ............................ 111/100 |
| 3,755,962 A * | 9/1973 | Walters et al. ................... 47/73 |
| 3,844,987 A * | 10/1974 | Clendinning et al. ............ 47/74 |
| 4,008,544 A * | 2/1977 | Rupprecht et al. ................ 47/77 |
| 4,031,832 A * | 6/1977 | Edwards ....................... 111/114 |
| 4,192,096 A * | 3/1980 | Platt et al. ......................... 47/73 |
| 4,641,457 A * | 2/1987 | Sandin ................................ 47/9 |
| 5,016,548 A * | 5/1991 | Ito .................................. 111/114 |
| 5,799,439 A * | 9/1998 | MacGregor ................... 47/57.6 |
| 6,195,938 B1 * | 3/2001 | Kay .................................. 47/77 |
| 6,481,155 B1 * | 11/2002 | Bugler et al. .............. 47/58.1 R |
| 2009/0272033 A1 * | 11/2009 | Paleari .............................. 47/74 |
| 2009/0277084 A1 * | 11/2009 | Kempf ........................... 47/66.3 |

FOREIGN PATENT DOCUMENTS

SE 469105 5/1993

* cited by examiner

*Primary Examiner* — T. Nguyen

(74) *Attorney, Agent, or Firm* — Lynn E. Barber

(57) ABSTRACT

A biodegradable cultivation tube, particularly designed to minimize root-twisting using specifically constructed tube edge profiles and tube holes. The cultivation tube has evaporation reducing and moisture trapping properties including a fluid absorbing material and an evaporation protection skirt.

10 Claims, 3 Drawing Sheets

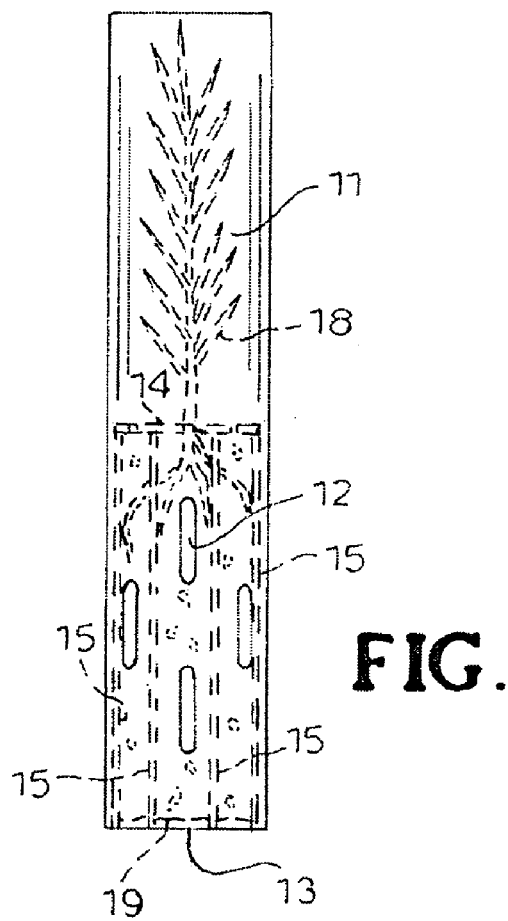
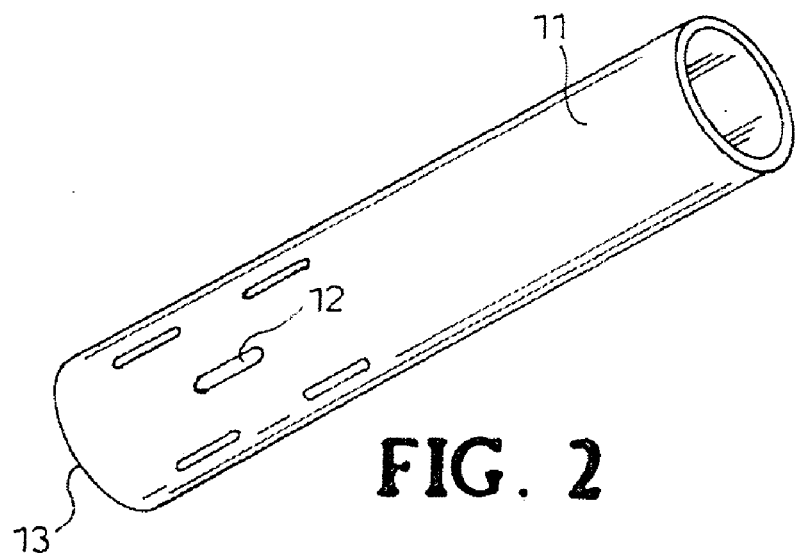

TUBE FOR PLANT CULTIVATION PREVENTING ROOT TWIST

BACKGROUND OF THE INVENTION

1. Field of the Invention

The invention herein relates to the cultivation of forests—and horticulture, whereas a germ or a sprout plant is made suitable to be localized in a tube. The tube is specifically designed to prevent so called root twist.

2. Problem to be Solved and description of the Related Art

In order to maintain satisfactory forestry production levels in the future, effective and biological correct methods are required to assure the re-growth of plants after trees are harvested. Re-forestation of forest clearings with financially desirable trees is often hampered when other vegetation competes for the clearings, before the re-forestation has reached the desired results. Within forestry, a number of methods have been developed that provide economically valuable trees with improved conditions to compete with the various types of vegetation in the forest clearings.

Difficulties in finding appropriate conditions where seeds can germinate and grow into plants in forest clearings have led to the need to grow seedlings into plants in artificial environments, for example, nurseries, and only after some time there do the plants become objects for transfer to the suitable cultivation sites. This occurs when the plants have achieved a size that is considered necessary in order for the plants, for example, to survive the competitive situation on promising forest clearings. Today this method of planting has been developed and is generally accepted above all on lands that have conditions for high forestry production. On less productive lands, at least from the forestry production point of view, this planting method has become too expensive.

Many experiments have been carried out in order to find cheaper methods for re-forestation by direct seeding rather than putting out pre-grown plants. The majority of the experiments have been concerned with planting the seedlings at clearings where methods are used to create appropriate growing conditions for the seedling to take root and grow to a small plant and gradually to a tree. The competition from the other vegetation is not generally as bad on poorly producing lands as it is on lands with high production. The interval between harvest and the time when unwanted plants take over in a cleared area becomes longer on weak lands. Thereby, seedlings have a better possibility to develop into established plants before the competing vegetation takes over the clearing.

One of the most difficult problems in growing a new forest directly from the germ stage till reforestation is the creation of appropriate environments for seedlings to grow within a reasonable time frame. There are of course many factors, which contribute to good conditions for seedlings to grow and eventually become established plants. The local habitat has the largest importance for seedling and plant development. Factors of the local habitat are frost, moisture and wind, which come in contact with seedlings and the sprouts. Another factor is the competing vegetation, which in association with fungus and pest such as insects, constitute other difficult factors that hamper the possibilities for seedlings to develop to established plants on a clearing. A third group of factors that influence the result for seedlings and sprouts is rodents and wild animals.

A serious problem that can occurs later in the life of the plant is root twisting, which is a deformation of the root system and is normally caused by improper positioning of the seedling at a nursery bed or by the design of containers in which the seedlings are grown. This can cause severe problems to the developed tree, for example in terms of stability and sensitivity to winds, potentially costing the forest owner substantial amounts.

The cultivation tube of the herein described invention improves in a crucial way the conditions for cultivation of desired tree kind on clearings and significantly reduces the problems with root twist. The invention is characterized by features described in patent SE469105 combined with two new features.

The features described in patent SE469105 are:

A. The cultivation tube includes a fluid absorbing material for absorption of moisture;

B. The cultivation tube includes an evaporation reducing function in order to prevent the moisture to disappear from the tube to C. The cultivation tube includes a vertically oriented open channel, that links/combines the fluid absorbing material with the atmosphere in order to permit rain and other moisture to enter the tube;

The new features of the invention herein, which is an improvement on that found in the prior art, are:

D. The tube is manufactured of a environmentally friendly material such as a bio-degradable plastic.

E. Tube edge facets/profiles and especially designed tube holes to prevent the twisting of the root system.

The invention gives unique possibilities of choosing a variety of tree kinds and plants for forest development, tailored to varying habitat in the forest clearing, at the same time as root twists are minimized. Forestry in Sweden, for example, is mainly focused on cultivation of coniferous trees such as pine, spruce, and *Pinus contorta*, and on leafy (deciduous) trees. The invention can of course be used also for other kinds of trees, and also within horticulture, although cultivation tubes and tools in the latter case may be adapted and re-dimensioned. The methods and possibilities for further modifications for specific needs are obvious.

SUMMARY OF THE INVENTION

A primary object of the invention is to provide a cultivation tube, more specifically a biodegradable tube particularly designed to minimize root-twisting. Another object of the invention is to provide a cultivation tube including a fluid absorbing material. A further object of the invention is to provide a cultivation tube with evaporation reducing and moisture trapping properties.

Other objects and features of the inventions will be more fully apparent from the following disclosure and appended claims.

BRIEF DESCRIPTION OF THE DRAWINGS

FIG. 1 is a side elevational view of a cultivation tube of the invention in which a seedling is planted in peat in the tube according to the invention.

FIG. 2 shows a side perspective view of a cultivation tube according to the invention.

DETAILED DESCRIPTION OF THE INVENTION AND PREFERRED EMBODIMENTS THEREOF

The invention's main components are shown in FIGS. 1-5. The main use of the invention is for reforesting, to be done efficiently and with a minimum risk of root twists. When used in horticulture, the tube of the invention is modified depending on what will be cultivated, local climate conditions, varying germ size and other factors. The invention is useful for growing small plants, which includes germ and sprout plants and other new plants.

With the use of bio-degradable plastics the tube of the invention will after a time, no longer than one year, be so degraded above as well as under ground, so that the plant can grow freely without any strangulation effects. The further degradation of the plastic is of course of benefit for environmental reasons. The tube can also be fitted with pre-cut areas to let the plant expand outside the shape of the tube.

In order to make use of the greenhouse effect, the invention may be provided with an upper evaporation protection skirt so that accumulated moisture is kept in the lower part of the tube also during sun and wind exposure.

In its basic embodiment, the cultivation tube for small plants of the invention herein, has a cylindrical wall, an enclosed channel, and an open top and bottom. A fluid absorbing material such as peat is placed at the bottom for absorption of moisture. The bottom is open to allow the roots to grow out, and the plant/germ is held in the tube by the peat placed in the tube to grow the plant. The top is open to permit placement of a plant in the tube and entry of moisture to the tube. Within the tube and perpendicular to the cylindrical wall is a centrally located evaporation protection skirt. The tube also has a plurality of parallel straight tube edge profiles on the cylindrical wall, preferably coaxial with the tube itself, and preferably the tube of the invention has elongated tube holes parallel to and between the tube edge profiles. The preferred tube of the invention is made of a biodegradable material.

Figure 3:
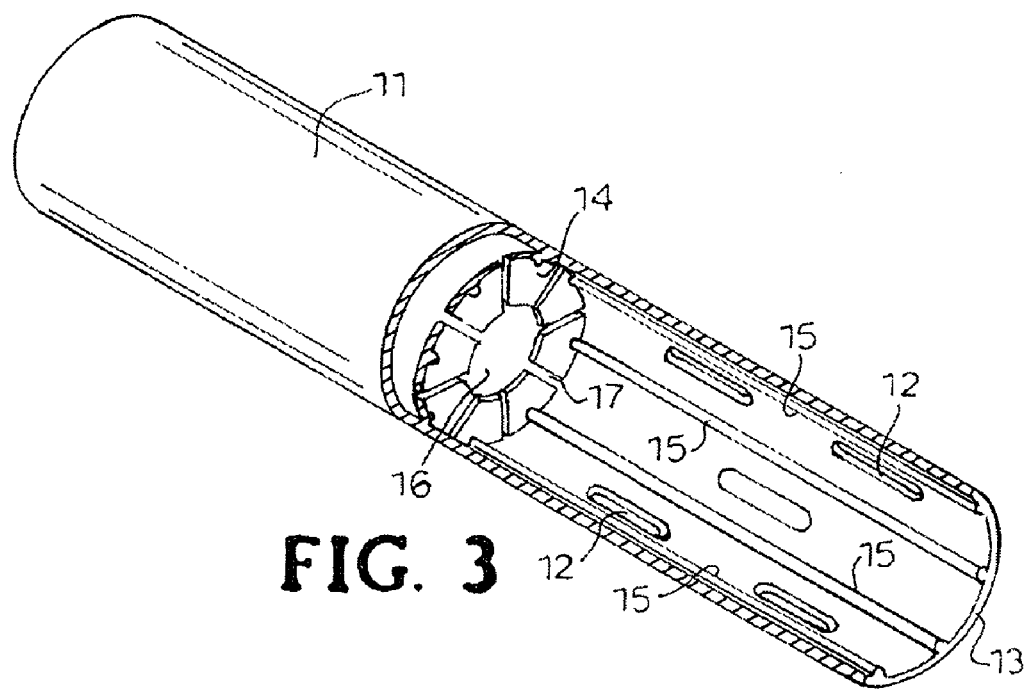
FIG. 3 is a side cut-away perspective view of the cultivation tube illustrated in FIG. 2, showing the evaporation protection skirt, tube edge profiles and tube holes in order to prevent root twist.

Referring to the figures, as shown in FIGS. 1-3, the invention comprises a tube 11 having tube holes 12. The tube holes 12 are located in the walls on the half of tube 11 that is closed to the bottom 13 of the tube.

Figure 4:
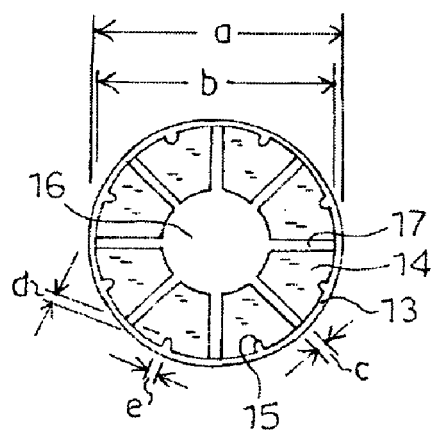
FIG. 4 is an end view of the cultivation tube.
Figure 5:
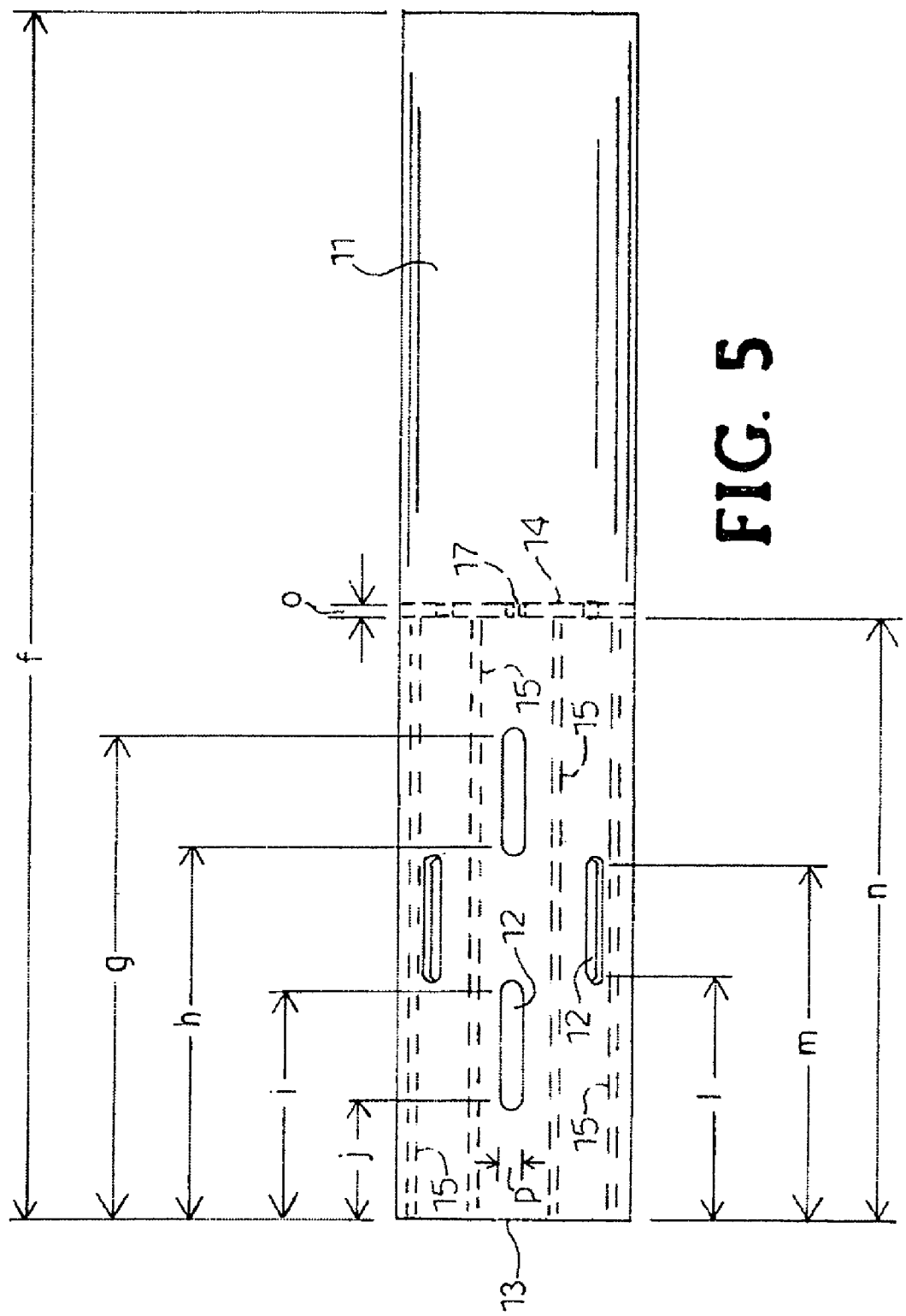
FIG. 5 is an elevational view of the cultivation tube showing various components for which the dimensions are provided in the text.

FIG. 4 is an end view of the tube showing the evaporation protection skirt 14. As shown in FIG. 5, the evaporation protection skirt 14 is positioned a distance n approximately 55 cm, and most preferably 54.85 cm, from the bottom 13 of the tube. The preferably eight tube edge profiles 15 extend from the evaporation protection skirt 14 down to the bottom 13 of the tube as shown in FIGS. 3 and 5. The dashed lines in FIG. 5 illustrate the tube edge profiles 15 placed on the inside of the tube.

The tube holes 12 are elongated and run parallel to and between the tube edge profiles 15. As shown in FIGS. 3 and 5, there preferably are two rows of holes 12 with two holes 12 in them between which rows of holes 12 there is a single hole 12. Where there is only one hole 12 between two parallel edge profiles 15, the end of the hole 12 closest to bottom 13 is a distance l from the bottom 13 and the other end of that hole 12 is a distance m from the bottom 13. In the rows with two holes 12 between adjacent parallel edge profiles 15, the distance j between the closest end of the closest hole 12 to bottom 13 being preferably about 11 mm, the distance i between the other end of that hole 12 and bottom 13 being about 21 mm, the distance h between the next (second) hole 12 in the same line and bottom 13 being about 34 mm, and the distance g between the other end of the second hole 12 being about 44 mm, with each hole 12 thus being about 10 mm long.

The tube edge profiles 15 and the specially designed tube holes 12 are made to prevent the twisting of the root system. As shown in FIGS. 4-5, the tube edge profiles 15 are preferably a width e of approximately 0.4 mm and a height d of approximately 1 mm, and protrude into the tube as shown.

The evaporation protection skirt 14 is made of the same biodegradable plastic as the rest of the tube to prevent evaporation. It is provided with a circular opening 16 and cuts 17. Water from rain and watering is able to run down inside the opening 16 and the germ sprout 18 is also able to grow up through this opening 16. The opening 16 has eight radial cuts 17 at regular intervals as shown in FIG. 4. The cuts 17 are preferably 5.5 mm long and a width c of 0.8 mm. The opening 16 is preferably 10 mm in diameter for the seedling 18 to be placed inside.

As can be seen in FIGS. 4-5, which indicate the areas having additional preferred dimensions as discussed herein, the tube holes 12 preferably have a width p of 2 mm and a length 10 mm long with rounded ends. There are preferably twelve tube holes 12. The tube 11 is approximately a length f of 11 cm, but can vary from 1 to 30 cm depending on the type of plant, and has a preferred external diameter a of approximately 22 mm, which in turn can vary between 5 to 75 mm depending on the overall size of the tube of the invention. The interior diameter b of tube 11 is preferably about 21.4 mm. The thickness of the tube wall (the difference between dimensions a and b) can vary from 0.1 to 1.0 mm, but is preferably 0.2 mm. The thickness o of the evaporation protection skirt 14 is preferably 0.3 mm. Adjustment of material thickness will be done of one of ordinary skill in the art depending on the selected materials characteristics.

The water absorption material which is to be placed in the tube in dry condition is preferably made of peat 19 (FIG. 1), but can also be made of mineral wool or other absorption materials, and is placed in the bottom part of the tube. A higher relative moisture combined with appropriate heat in the tube is, up to a certain level, best both for germination and the plant's photosynthesis. A dried plant is also more easily damaged by frost. One more way to minimize the damage of frost is to set out the cultivation tube in a so-called "pile of soil" creating a more beneficial climate compared to the surrounding area.

The tube may be any color as known, however, in the preferred embodiment, tube's white color also has that advantage that hibernation of the plant starts earlier in the autumn due to less light access in the tube compared with conditions outside.

The tube used in the invention is manufactured by Symphony Plastic Technologies of the United Kingdom and distributed by Switch Pac (Stockholm, Sweden) under the trademark d2w®. Switch Pac, Sweden, but also other biodegradable materials can be used in the invention.

To use the invention, cultivation tubes containing small plants 18 (FIG. 1) are placed in boxes of the appropriate form for the transportation to the clearing, where all the cultivation tubes with plants are watered a couple of days before the cultivation tubes will be set out in to the clearing. Moisture inside the tube is controlled and being complemented. Preferably, the peat should be soaking. From here on the cultivation tubes are set out into the clearing. The water in the tube is to be maintained for about 8-12 days and nights. Statistically, rain falls every 5-7 days in Sweden. This means that the plants inside the cultivation tube are likely to develop through that moisture and can be kept in a satisfactory and high level.

The watering can be done with clean water or can be replaced with a "weak water solution of potassium sulphate (2-4 g/l). The best germination is received by a slightly sour water solution, pH=6, 8.

During certain conditions seedlings in cultivation tubes can be permitted to grow and sprouts or sprout plants can be developed in cultivation tubes before setting them out in into the soil. In this case, the watering solution should comprise mineral-fertilizer, for example NPK (Yara, Landskrona, Sweden), including trace elements that are important for development of plants that are grown in a non-soil environment as known in the art.

Other objects and features of the inventions will be more fully apparent from the following examples and appended claims.

EXAMPLE 1

Manufacture of a Cultivation Tube

The cultivation tube is preferably cast in one peace in a mold adjusted for the dimensions described in the detailed description of the invention. The biodegradable plastic used is d2w® (Switch Pac, Sweden). The fluid absorbing material is made of peat.

What is claimed is:

1. A cultivation tube for germination and planting of small plants, comprising:
   a) a cylindrical wall and an open top to permit placement of a plant or seed for germination in the tube and entry of moisture to the tube and an open bottom to allow the plant roots to grow out, the wall surrounding an enclosed channel;
   b) a centrally located evaporation protection skirt within the enclosed channel and perpendicular to the cylindrical wall; and
   c) a plurality of parallel straight tube edge profiles within the enclosed channel on the cylindrical wall extending between the evaporation protection skirt and the bottom of the tube;
   wherein a fluid absorbing material is placed within the bottom of the tube for absorption of moisture; the cylindrical tube has elongated tube holes parallel to the tube edge profiles, the elongated tube holes having rounded ends, and the tube is made of a biodegradable material.

2. The cultivation tube of claim 1 wherein the evaporation protection skirt comprises a circular disk having a central circular opening and eight radial cuts extending between the cylindrical wall and the central opening.

3. The cultivation tube of claim 1 wherein the fluid absorbing material is made of peat.

4. The cultivation tube of claim 1, wherein the tube is made of a biodegradable plastic.

5. The cultivation tube according to claim 4 wherein the biodegradable plastic is d2w®.

6. The cultivation tube of claim 1, wherein the tube edge profiles are 0.4 mm wide and 1 mm high.

7. The cultivation tube of claim 1, wherein the tube holes are located between the evaporation protection skirt and the bottom of the tube.

8. The cultivation tube of claim 1, wherein the tube holes are 10 mm wide and 2 mm long.

9. The cultivation tube of claim 1, wherein the tube is cast in one peace in a mold.

10. The cultivation tube of claim 1, wherein the small plants are tree sprouts or germ plants.

* * * * *